United States Patent [19]
Koike

[11] Patent Number: 5,550,647
[45] Date of Patent: Aug. 27, 1996

[54] IMAGE PROCESSING APPARATUS FOR CONVERTING A MULTILEVEL IMAGE SIGNAL INTO A BI-LEVEL IMAGE SIGNAL

[75] Inventor: Kazumasa Koike, Atsugi, Japan

[73] Assignee: Ricoh Company, Ltd., Tokyo, Japan

[21] Appl. No.: 946,889

[22] Filed: Sep. 18, 1992

[30] Foreign Application Priority Data

Sep. 20, 1991 [JP] Japan .................................. 3-268619
Nov. 19, 1991 [JP] Japan .................................. 3-329814
May 13, 1992 [JP] Japan .................................. 4-146942

[51] Int. Cl.⁶ .................................................. H04N 1/46
[52] U.S. Cl. .......................... 358/462; 358/456; 358/534; 358/429
[58] Field of Search ................................. 358/462, 455, 358/456, 519, 534, 429; 341/131

[56] References Cited

U.S. PATENT DOCUMENTS

| | | | |
|---|---|---|---|
| 4,953,013 | 8/1990 | Tsuji et al. | 358/75 |
| 4,965,744 | 10/1990 | Wagatsuma et al. | 358/462 |
| 5,131,059 | 7/1992 | Kobayashi et al. | 358/429 |
| 5,250,948 | 10/1993 | Berstein et al. | 341/131 |
| 5,267,330 | 11/1993 | Masuda | 358/429 |

FOREIGN PATENT DOCUMENTS 56-25824   3/1981   Japan ..................................... 341/131

*Primary Examiner*—Victor R. Kostak
*Assistant Examiner*—Cheryl Cohen
*Attorney, Agent, or Firm*—Lowe, Price, LeBlanc & Becker

[57] ABSTRACT

An image processing apparatus includes a bit conversion part for converting an input multilevel image signal obtained via raster scanning into an output multilevel image signal through an MTF correction processes; a bi-level rendition part for performing a bi-level rendition processes with respect to the output multilevel image signal so that a first bi-level image signal is produced, and for performing a pseudo halftone rendition process with respect to the input multilevel image signal to generate a second bi-level image signal; a discrimination part for detecting whether a picture element indicated by the input multilevel image signal is located in a halftone region of an original image or in a bi-level region thereof, and an image synthesizing part for outputting the first bi-level image signal to an output device when the picture element is detected as being located in the bi-level region of the original image and for outputting the second bi-level image signal to the output device when the picture element is detected as being located in the halftone region of the original image.

8 Claims, 14 Drawing Sheets

| PD | | | | | DD | | | | | | |
|---|---|---|---|---|---|---|---|---|---|---|---|
| 3 | 2 | 1 | 0 | (DECIMAL) | 5 | 4 | 3 | 2 | 1 | 0 | (DECIMAL) |
| 0 | 0 | 0 | 0 | (0) | 0 | 0 | 0 | 0 | 0 | 0 | (0) |
| 0 | 0 | 0 | 1 | (1) | 0 | 0 | 0 | 1 | 0 | 0 | (4) |
| 0 | 0 | 1 | 0 | (2) | 0 | 0 | 1 | 0 | 0 | 0 | (8) |
| 0 | 0 | 1 | 1 | (3) | 0 | 0 | 1 | 1 | 0 | 0 | (12) |
| 0 | 1 | 0 | 0 | (4) | 0 | 1 | 0 | 0 | 0 | 0 | (16) |
| 0 | 1 | 0 | 1 | (5) | 0 | 1 | 0 | 1 | 0 | 0 | (20) |
| 0 | 1 | 1 | 0 | (6) | 0 | 1 | 1 | 0 | 0 | 0 | (24) |
| 0 | 1 | 1 | 1 | (7) | 0 | 1 | 1 | 1 | 0 | 0 | (28) |
| 1 | 0 | 0 | 0 | (8) | 1 | 0 | 0 | 0 | 0 | 0 | (32) |
| 1 | 0 | 0 | 1 | (9) | 1 | 0 | 0 | 1 | 0 | 0 | (36) |
| 1 | 0 | 1 | 0 | (10) | 1 | 0 | 1 | 0 | 0 | 0 | (40) |
| 1 | 0 | 1 | 1 | (11) | 1 | 0 | 1 | 1 | 0 | 0 | (44) |
| 1 | 1 | 0 | 0 | (12) | 1 | 1 | 0 | 0 | 0 | 0 | (48) |
| 1 | 1 | 0 | 1 | (13) | 1 | 1 | 0 | 1 | 0 | 0 | (52) |
| 1 | 1 | 1 | 0 | (14) | 1 | 1 | 1 | 0 | 0 | 0 | (56) |
| 1 | 1 | 1 | 1 | (15) | 1 | 1 | 1 | 1 | 0 | 0 | (60) |

FIG.6
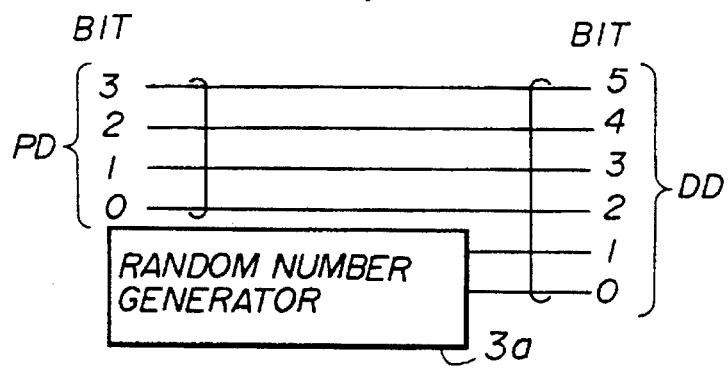
FIG.7
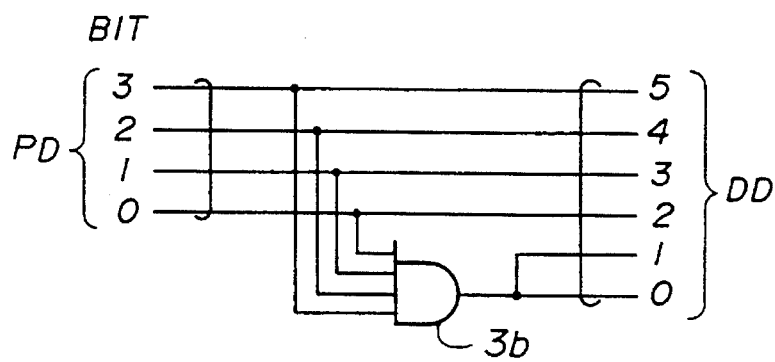
FIG.8
| PD | | | | (DECIMAL) | DD | | | | | | (DECIMAL) |
|---|---|---|---|---|---|---|---|---|---|---|---|
| 3 | 2 | 1 | 0 | | 5 | 4 | 3 | 2 | 1 | 0 | |
| 0 | 0 | 0 | 0 | (0) | 0 | 0 | 0 | 0 | 0 | 0 | (0) |
| 0 | 0 | 0 | 1 | (1) | 0 | 0 | 0 | 1 | 0 | 0 | (4) |
| 0 | 0 | 1 | 0 | (2) | 0 | 0 | 1 | 0 | 0 | 0 | (8) |
| 0 | 0 | 1 | 1 | (3) | 0 | 0 | 1 | 1 | 0 | 0 | (12) |
| 0 | 1 | 0 | 0 | (4) | 0 | 1 | 0 | 0 | 0 | 0 | (16) |
| 0 | 1 | 0 | 1 | (5) | 0 | 1 | 0 | 1 | 0 | 0 | (20) |
| 0 | 1 | 1 | 0 | (6) | 0 | 1 | 1 | 0 | 0 | 0 | (24) |
| 0 | 1 | 1 | 1 | (7) | 0 | 1 | 1 | 1 | 0 | 0 | (28) |
| 1 | 0 | 0 | 0 | (8) | 1 | 0 | 0 | 0 | 0 | 0 | (32) |
| 1 | 0 | 0 | 1 | (9) | 1 | 0 | 0 | 1 | 0 | 0 | (36) |
| 1 | 0 | 1 | 0 | (10) | 1 | 0 | 1 | 0 | 0 | 0 | (40) |
| 1 | 0 | 1 | 1 | (11) | 1 | 0 | 1 | 1 | 0 | 0 | (44) |
| 1 | 1 | 0 | 0 | (12) | 1 | 1 | 0 | 0 | 0 | 0 | (48) |
| 1 | 1 | 0 | 1 | (13) | 1 | 1 | 0 | 1 | 0 | 0 | (52) |
| 1 | 1 | 1 | 0 | (14) | 1 | 1 | 1 | 0 | 0 | 0 | (56) |
| 1 | 1 | 1 | 1 | (15) | 1 | 1 | 1 | 1 | 1 | 1 | (63) |

| PD | | | | | DD | | | | | | |
|---|---|---|---|---|---|---|---|---|---|---|---|
| 3 | 2 | 1 | 0 | (DECIMAL) | 5 | 4 | 3 | 2 | 1 | 0 | (DECIMAL) |
| 0 | 0 | 0 | 0 | (0) | 0 | 0 | 0 | 0 | 0 | 0 | (0) |
| 0 | 0 | 0 | 1 | (1) | 0 | 0 | 0 | 1 | 0 | 0 | (4) |
| 0 | 0 | 1 | 0 | (2) | 0 | 0 | 1 | 0 | 0 | 0 | (8) |
| 0 | 0 | 1 | 1 | (3) | 0 | 0 | 1 | 1 | 0 | 0 | (12) |
| 0 | 1 | 0 | 0 | (4) | 0 | 1 | 0 | 0 | 1 | 0 | (17) |
| 0 | 1 | 0 | 1 | (5) | 0 | 1 | 0 | 1 | 0 | 1 | (21) |
| 0 | 1 | 1 | 0 | (6) | 0 | 1 | 1 | 0 | 0 | 1 | (25) |
| 0 | 1 | 1 | 1 | (7) | 0 | 1 | 1 | 1 | 0 | 1 | (29) |
| 1 | 0 | 0 | 0 | (8) | 1 | 0 | 0 | 0 | 1 | 0 | (34) |
| 1 | 0 | 0 | 1 | (9) | 1 | 0 | 0 | 1 | 1 | 0 | (38) |
| 1 | 0 | 1 | 0 | (10) | 1 | 0 | 1 | 0 | 1 | 0 | (42) |
| 1 | 0 | 1 | 1 | (11) | 1 | 0 | 1 | 1 | 1 | 0 | (46) |
| 1 | 1 | 0 | 0 | (12) | 1 | 1 | 0 | 0 | 1 | 1 | (51) |
| 1 | 1 | 0 | 1 | (13) | 1 | 1 | 0 | 1 | 1 | 1 | (55) |
| 1 | 1 | 1 | 0 | (14) | 1 | 1 | 1 | 0 | 1 | 1 | (59) |
| 1 | 1 | 1 | 1 | (15) | 1 | 1 | 1 | 1 | 1 | 1 | (63) |

# IMAGE PROCESSING APPARATUS FOR CONVERTING A MULTILEVEL IMAGE SIGNAL INTO A BI-LEVEL IMAGE SIGNAL

BACKGROUND OF THE INVENTION

The present invention generally relates to an image processing apparatus, and more particularly to an image processing apparatus in which multilevel image data obtained from a composite image through raster scanning is subjected to an MTF (modulation transfer function) correction process and a bi-level rendition process for improving the picture quality of bi-level image portions of the multilevel image data while it is subjected to a gamma correction process and a pseudo halftone rendition process for improving the picture quality of halftone image portions of the multilevel image data.

In image processing apparatuses such as facsimile machines, a multilevel image data is read from an original image via raster scanning, the multilevel image data is converted into a bi-level image data through a bi-level rendition process, and the resultant bi-level image data is transmitted, received or temporarily stored. Since a certain amount of the original image information is lost when the bi-level rendition process is performed, the picture quality may be seriously degraded when an output image is output by the image processing apparatus from such a bi-level image received from an external facsimile unit or temporarily stored within the image processing apparatus. For example, a faded portion appears in the output image due to the bi-level rendition process having been performed. For this reason, there is a problem in that the picture quality of the hi-level image becomes worse than that of the original image.

In order to prevent the picture quality of the output image from being degraded due to the bi-level rendition process through which the input multilevel image data is converted into the output bi-level image data, several improving attempts have been made. For example, an MTF correction process (which will be described below) is performed with respect to the bi-level image in order to reduce the faded portion in the output image. A pseudo halftone rendition process to which an error diffusion method is applied (which process will be described later) is performed with respect to the halftone image in order to improve the picture quality of the output image. A gamma correction process is performed with respect to multilevel image data read from a halftone image such as a photograph, in order to reduce differences between the input image gradation characteristics of the image input part and the output image gradation characteristics of the image output part. With respect to the resulting multilevel image data due to the gamma correction process, a pseudo halftone rendition process or the like is performed.

In a case in which the multilevel image data is obtained from a composite image in which a bi-level image and a halftone image coexist on one page, the MTF correction process and the simple bi-level rendition process are performed with respect to a bi-level image portion of the multilevel image data while the gamma correction process and the pseudo halftone rendition process are performed with respect to a halftone image portion thereof in order to prevent the output image from having a poor picture quality.

FIG. 1 shows a conventional image processing apparatus in which the above mentioned correction processes are performed. In FIG. 1, the multilevel image data obtained from an original image through the raster scanning is supplied per one scanning line to both a line buffer 1001 and a gamma corrector 1002. In the line buffer 1001, the multilevel image data corresponding to a number of scanning lines is temporarily stored, and the stored image data is supplied per one scanning line to an MTF corrector 1003. The MTF corrector 1003 performs the MTF correction process with respect to the image data received, and a bi-level rendition part 1004 performs the bi-level rendition process with respect to the resulting image data so that the multilevel image data is converted into the bi-level image data.

The gamma corrector 1002 performs the gamma correction process with respect to the multilevel image data received, and the resulting image data is supplied to a line buffer 1005. In the line buffer 1005, the multilevel image data corresponding to a number of scanning lines is temporarily stored, and the stored image data is supplied per one scanning line to a pseudo halftone rendition part 1006. The pseudo halftone rendition part 1006 performs the pseudo halftone rendition process so that the multilevel image data received is converted into the bi-level image data. An image synthesizer 1007 selectively receives the bi-level image data from the bi-level rendition part 1004 which data corresponds to a bi-level image portion of the original image, and selectively receives the bi-level image data from the pseudo halftone rendition part 1006 which data corresponds to a halftone image portion of the original image. Then, the image synthesizer 1007 produces an output image with respect to one page from these bi-level image data being received.

However, in the case of the above described apparatus, there is a problem in that the picture quality of the bi-level image cannot be sufficiently improved after the correction processes are performed therefor. Also, there is a problem in that the manufacture of the above described apparatus is expensive because it requires two line buffers for performing different correction processes with respect to each of the bi-level image portion and the halftone image portion contained in one page of the composite image.

SUMMARY OF THE INVENTION

Accordingly, it is a general object of the present invention to provide an improved image processing apparatus in which the above described problems are eliminated.

Another, more specific object of the present invention is to provide an image processing apparatus in which the picture quality of the bi-level region of the output image can be suitably improved when the correction processes are performed.

Still another object of the present invention is to provide an image processing apparatus which enables the manufacturing cost to be low in the cases in which different correction processes are performed with respect to each of the bi-level image portion and the halftone image portion contained in one page of the composite image.

The above mentioned objects of the present invention are achieved by an image processing apparatus which includes a correction part for converting an input multilevel image signal, obtained from an original image through raster scanning, into an output multilevel image signal through an MTF correction process, a first bi-level rendition part for performing a simple bi-level rendition process with respect to the multilevel image signal output by the correction part, so that a first bi-level image signal is output by the first bi-level rendition part, a second bi-level rendition part for performing a pseudo halftone rendition process with respect to the input multilevel image signal to output a second bi-level image signal, a discrimination part for detecting whether a target pixel indicated by the input multilevel image signal is located in a halftone region of the original image or in a bi-level region thereof, and an image synthesizing part for outputting the first bi-level image signal to an output device via the first bi-level rendition part when the target pixel is detected by the discrimination part as being located in the bi-level region, and for outputting the second bi-level image signal to the output device via the second bi-level rendition part when the target pixel is detected by the discrimination part as being located in the halftone region.

According to the present invention, the MTF correction effect when the MTF correction process is performed is suitably adjusted in accordance with the kind of the input multilevel image, thus increasing the picture quality of the bi-level region of the output image. When the multilevel image signal indicates an intermediate density value, it is subjected to the linear gamma correction process, enabling the data of the intermediate density to be maintained. The bi-level region of the multilevel image data is subjected to the MTF correction and simple bi-level rendition processes so as to produce an appropriate image quality thereof. The halftone region of the multilevel image data is subjected to the improved gamma correction and pseudo halftone rendition processes so as to produce an appropriate image quality thereof. Also, the image processing apparatus of the present invention requires only one buffer memory, enabling the manufacturing cost to be low without seriously degrading the picture quality.

Other objects and further features of the present invention will be apparent from the following detailed description when read in conjunction with the accompanying drawings.

BRIEF DESCRIPTION OF THE DRAWINGS

FIG.6 is a diagram showing another example of the bit converter of the image processing apparatus;

FIG. 7 is a diagram showing still another example of the bit converter;

FIG. 8 is a chart for explaining a conversion process performed by the bit converter shown in FIG. 7;

DESCRIPTION OF THE PREFERRED EMBODIMENTS

Figure 1:
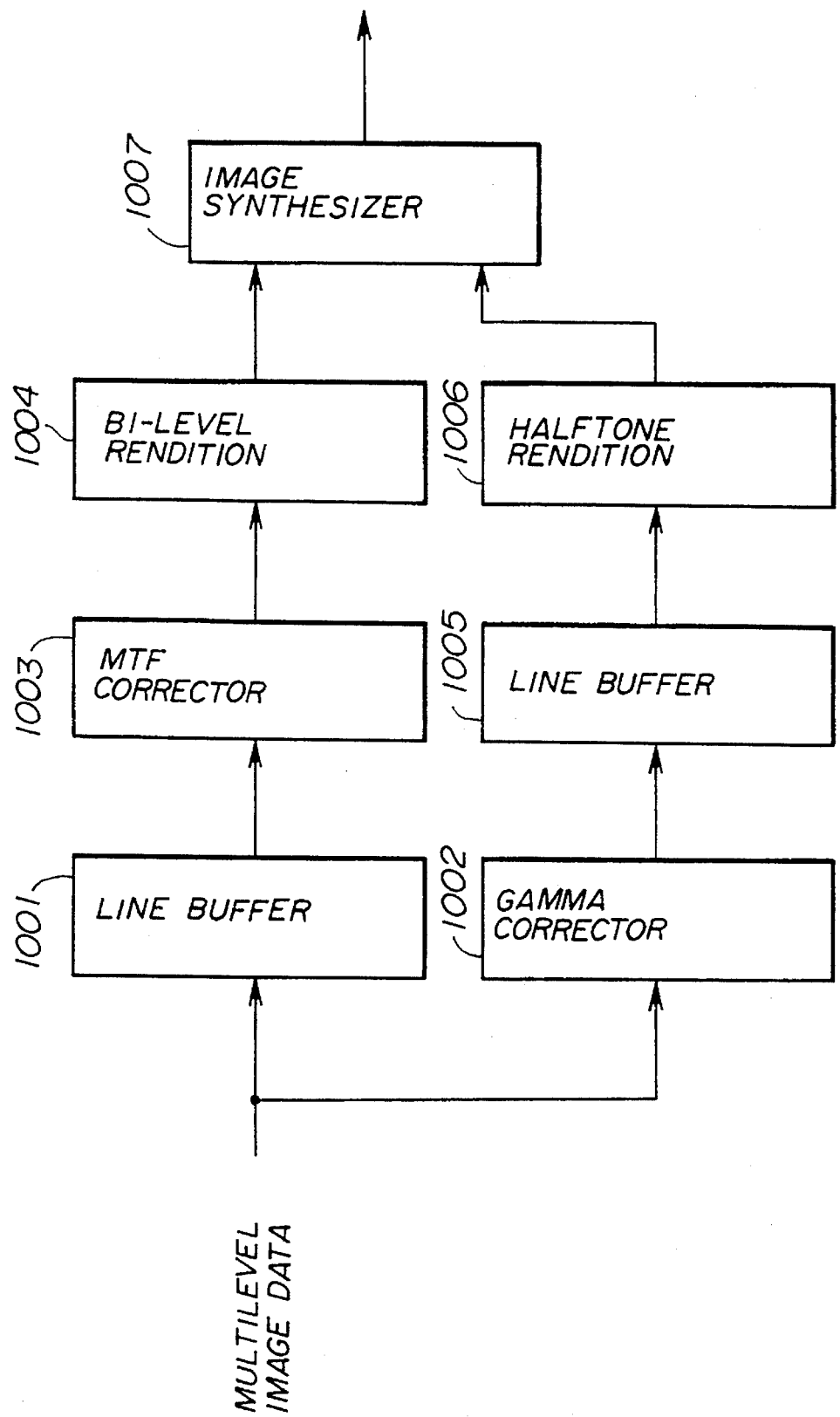
FIG. 1 is a block diagram showing a conventional image processing apparatus.
Figure 2:
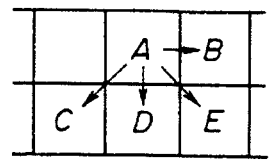
FIG. 2 is a diagram for explaining a pseudo halftone rendition process to which an error diffusion method is applied.

First, a description will be given, with reference to FIG. 2, of the pseudo halftone rendition process to which the error diffusion method is applied. In this bi-level rendition process, an input density of a target pixel A of an input image, as shown in FIG. 2, is converted into an output density, and this output density is assigned to the target pixel A. An error, or a difference between the input density value and the output density value is generated, and this error is corrected and evenly assigned as the bi-level rendition error to neighborhood pixels B, C, D and E appearing after the target pixel A in the input image (as shown in FIG. 2). The procedure of the above bi-level rendition process to which the error diffusion method is applied can be expressed in the form of the following formula:

$$f'(xy) = f(xy) + (1/\Sigma a(ij))\Sigma a(ij)e(x+i\ y+j) \quad (1)$$
$$e(xy) = f'(xy) - B \quad \text{if } f'(xy) \geq T$$
$$e(xy) = f'(xy) \quad \text{if } f'(xy) < T$$

In this formula, f(xy) indicates the input density value of the target pixel, f'(xy) indicates the output density value thereof (or the corrected density value), a(ij) indicates a set of diffusion coefficients, e(xy) indicates the bi-level rendition error, T indicates a prescribed threshold value, and B indicates the black density level of the image to be processed.

More specifically, in a case in which the input density value of the target pixel A is indicated by a 4-bit image signal and the threshold value T is equal to 8 and in which the bi-level rendition error e(xy) with respect to the target pixel A is equal to 7, the error, which should be evenly assigned to each of the neighborhood pixels B through E, becomes equal to ⁷⁄₄. However, the procedure of the above bi-level rendition process is conventionally achieved by means of arithmetic integer operations, for the sake of simplicity of the image processing hardware. If the arithmetic integer operations are used, the value of the error evenly assigned to each of the four neighborhood pixels is converted into the value "1" because the decimal fractions of the error (which is equal to 7/4=1.75) are truncated.

Therefore, the total of the errors actually assigned to the 5 neighborhood pixels is equal to 4, and it does not accord with the value of the bi-level rendition error (=7) with respect to the target pixel A. For this reason, the picture quality of the bi-level image is degraded when the bi-level rendition process is performed by the conventional image processing apparatus. According to the present invention, the number of bits in the input multilevel image data obtained via raster scanning is increased in order to prevent the output bi-level image from having poor quality due to the above described bi-level rendition process being performed by means of the arithmetic integer operations.

A description will now be given of the first embodiment of the image processing apparatus according to the present invention with reference to FIG. 3. In the image processing apparatus shown in FIG. 3, an image reader 1 reads a multilevel image from an original document via raster scanning, and outputs an analog image signal AV. The density value of the multilevel image is indicated by a voltage of the analog image signal AV output by the image reader 1. This analog image signal AV is converted into a 4-bit digital image signal PD by an A/D converter 2. The 4-bit digital image signal PD output by the A/D converter 2 is supplied to a bit converter 3.

According to the image processing apparatus of the present invention, by means of the bit converter 3, the 4-bit digital image signal PD is converted into a 6-bit image signal DD having two additional bits.

Figure 3:
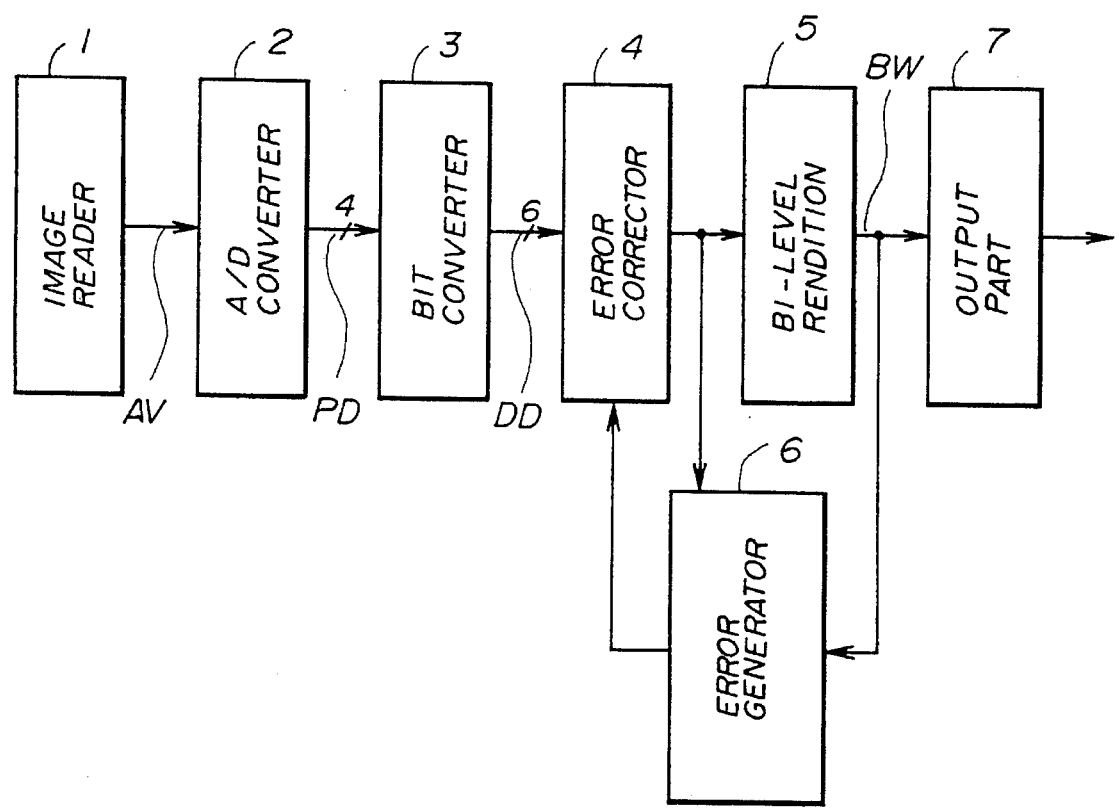
FIG. 3 is a block diagram showing a first embodiment of the image processing apparatus according to the present invention.

In the image processing apparatus shown in FIG. 3, an error corrector 4, a bi-level rendition part 5 and an error generator 6 carry out the above described pseudo halftone rendition process to which the error diffusion method is applied. The 6-bit digital image signal DD output by the bit converter 3 is supplied to the error corrector 4. The above mentioned bi-level rendition process is performed with respect to the 6-bit digital image signal DD. The bi-level rendition part 5 outputs a bi-level image signal BW to an output part 7 so that the bi-level image signal is output to an external unit (not shown) through the output part 7.

Figures 4, 5:
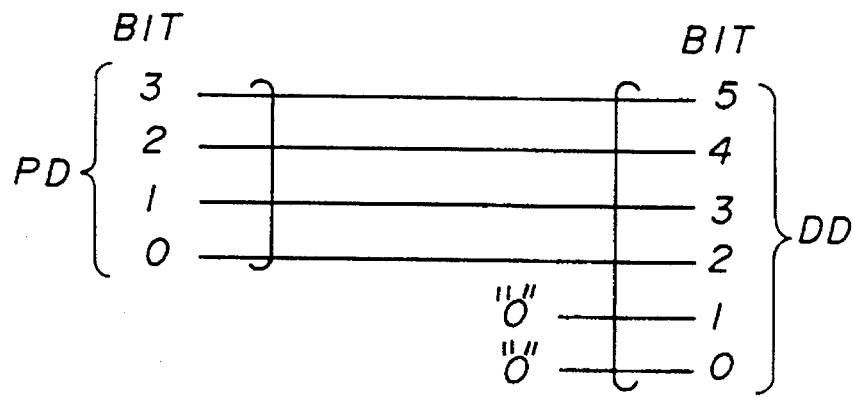
FIG. 4 is a diagram showing a bit converter of the image processing apparatus shown in FIG. 3.
FIG. 5 is a chart for explaining a conversion process performed by the bit converter shown in FIG. 4.

FIG. 4 shows an example of the bit converter 3 in the image processing apparatus shown in FIG. 3. In the bit converter shown in FIG. 4, the 4-bit input digital image signal PD is converted into the 6-bit output digital image signal DD. All the image data of the input signal PD at four bit positions "0" through "3" is assigned to the image data of the output signal DD at four highest order bit positions "2" through "5" with no changes. The value "0" in binary is assigned to each of the remaining portions of the output signal DD at two lowest order bit positions "0" and "1".

FIG. 5 shows a relationship between the values of the input signal PD and the corresponding values of the output signal DD. This relationship is applied to the above mentioned conversion process performed by the bit converter shown in FIG. 4. As shown in FIG. 5, the values of the 6-bit output digital image signal DD are varied in accordance with the values of the 4-bit input digital image signal PD. When the bi-level rendition process is performed in the same conditions as described above, it is possible to prevent the picture quality of the bi-level image from being degraded, according to the present invention.

More specifically, a case in which the input density value of the target pixel A is indicated by the 4-bit image signal PD and the threshold value T is set to the value "32" in decimal (which value is the middle density level of the output signal DD shown in FIG. 5) will be considered. When the input density value of the target pixel A indicated by the 4-bit input signal PD is equal to 7 in decimal, the corresponding value of the 6-bit output signal DD is equal to 28 in decimal as shown in FIG. 5. Since the input density value of the target pixel A is smaller than the threshold value T, the bi-level rendition error with respect to the target pixel A is equal to 28 in decimal. Thus, the error which should be evenly assigned to each of the neighborhood pixels B through E becomes equal to 7 (=28/4) in decimal. The above mentioned error always becomes any integer, and it is evenly assigned to each of the neighborhood pixels. Hence, it is possible to prevent the picture quality of the bi-level image from becoming poor due to the bi-level rendition process being performed since no fractional errors are produced after the bi-level rendition process is performed with respect to the target pixel to which an intermediate density value is assigned.

FIG. 6 shows a different example of the bit converter 3 in the image processing apparatus shown in FIG. 3. This bit converter includes a random number generator 3a for outputting a random number (in binary) to the image data of the output signal DD at two lowest order bit positions. In the case of the bit converter shown in FIG. 6, all the image data of the input signal PD at four bit positions "0" through "3" is assigned to the image data of the output signal DD at four highest order bit positions "2" through "5", while the value of the random number (in binary) output by the random number generator 3a is assigned to each of the portions of the output signal DD at two lowest order bit positions "0" and "1". In the case of the bit converter shown in FIG. 4, the maximum density level of the output signal DD is 60 in decimal which is different from the value ("63" in decimal) of the black density level B. Thus, there is a problem in that the density level of the bi-level image is relatively low as a whole and that an unwanted white spot may appear in a black solid region of the output image. In the case of the bit converter shown in FIG. 6, it is possible to correctly reproduce the black solid region of the image and the above mentioned problem is eliminated.

FIG. 7 shows still another example of the bit converter in the image processing apparatus shown in FIG. 3. This bit converter includes an AND circuit 3b, four input terminals of the AND circuit 3b being coupled to the four bit positions "0" through "3" to which the 4-bit input signal PD is supplied, and two output terminals of the AND circuit 3b being coupled to the two lowest order bit positions "0" and "1", from which the 6-bit output signal DD is output. All the image data of the input signal PD at four bit positions "0" through "3" is assigned to the image data of the output signal DD at the four highest order bit positions "2" through "5", while the value (in binary) of the logical conjunction of the input signal PD output by the AND circuit 3b is assigned to each of the portions of the output signal DD at the two lowest order bit positions "0" and "1". In the case of the bit converter shown in FIG. 6, the maximum density level of the output signal DD is set to 63 in decimal which is the same as the value of the black density level B, as shown in a relationship between the values of the input signal PD and the corresponding values of the output signal DD which relationship is indicated in FIG. 8. Thus, it is possible to correctly reproduce the black solid region of the original image.

Figures 9, 10:
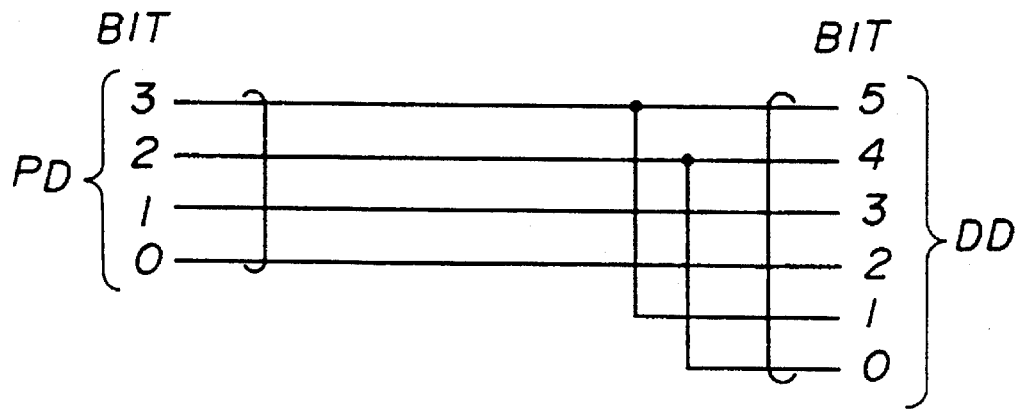
FIG. 9 is a diagram showing a modification of the bit converter shown in FIG. 7.
FIG. 10 is a chart for explaining a conversion process performed by the bit converter shown in FIG. 9.

FIG. 9 shows a further example of the bit converter in the image processing apparatus shown in FIG. 3. In the bit converter shown in FIG. 9, the image data of the input signal PD at four bit positions "0" through "3" is assigned to the image data of the output signal DD at four highest order bit positions "2" through "5", while the image data of the input signal PD at two highest order positions "2" and "3" are assigned to the remaining portions of the output signal DD at two lowest order bit positions "0" and "1" respectively.

FIG. 10 shows a relationship between the values of the input signal PD and the corresponding values of the output signal DD. This relationship is applied to the above mentioned conversion process performed by the bit converter shown in FIG. 9. As shown in FIG. 10, the values of the 6-bit output digital image signal DD are varied in accordance with the values of the 4-bit input digital image signal PD. More specifically, when the 4-bit input digital image signal PD indicates a density level from among 0, 1, 2, 3, 4, 5, 6, 7, 8, 9, 10, 11, 12, 13, 14, and 15 in decimal, the 6-bit output digital image signal DD indicates a density level from among 0, 4, 8, 12, 17, 21, 25, 29, 34, 38, 42, 46, 51, 59, and 63, respectively. Thus, the distribution of the density levels of the output signal DD is appropriately in conformity with that of the input signal PD.

In the above described embodiment, the 4-bit digital image signal PD is converted into the 6-bit digital image signal DD. However, the present invention is not limited to the particular number of bits used for the input and output image signals.

Figures 11, 12:
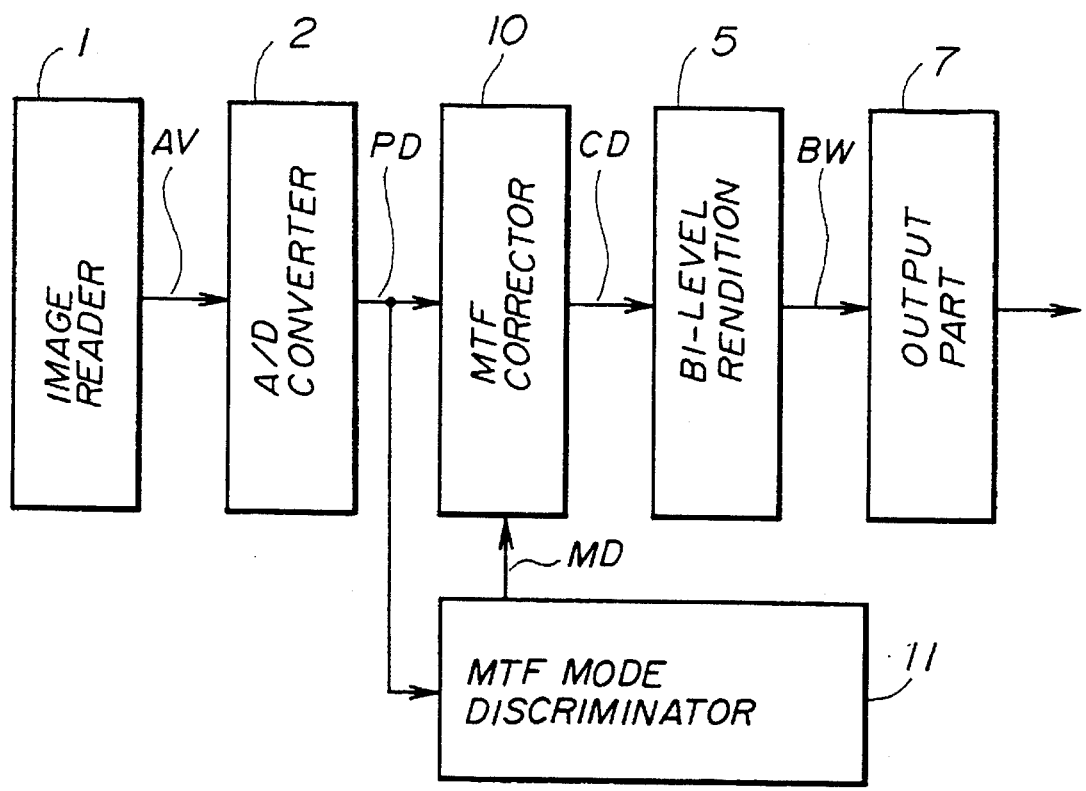
FIG. 11 is a diagram showing a matrix of pixels to which an MTF correction process according to the present invention is applied.
FIG. 12 is a block diagram showing a second embodiment of the image processing apparatus according to the present invention.

As described above, the MTF correction process is performed in order to reduce the faded portion which occasionally appears when the non-halftone image is converted into the bi-level image. In the MTF correction process, a group of pixels of an input image shown in FIG. 11 is kept in mind, and an input density value E of the target pixel in the group is converted into an output density value E' by taking into account the density values B, D, F, H of the four neighborhood pixels in the group when the MTF correction process is performed. An output density value E' of the target pixel when a moderate correction effect is desired as the result of the MTF correction process is represented by the following formula.

$$E' = 3E - (B+D+F+H)/2 \qquad (2)$$

Also, an output density value E' of the target pixel when a sharp correction effect is desired as the result of the MTF correction process is represented by the following formula.

$$E' = 5E - (B+D+F+H) \qquad (3)$$

Generally speaking, when the MTF correction process with a sharp correction effect on the output image is performed, the output image has a high resolution, and it includes a sharp edge portion in a case in which a bi-level line image such as a character is subjected to the MTF correction process. In this case, however, an undesired image noise is likely to appear in a background portion of the image. The MTF correction process with a sharp correction effect to which the above formula (3) is applied (this MTF correction process is called an MTF mode-2) is suitable for a case in which a fine image portion containing very small characters or graphic patterns is processed.

Conversely, the MTF correction process with a moderate correction effect to which the above formula (2) is applied (this MTF correction process is called an MTF mode-1) is suitable for a case in which a background portion of the input image or the like is processed. Accordingly, in order to make the picture quality of the output image better, it is desirable to select the MTF mode-1 when the background portion of the input image is processed, and to select the MTF mode-2 when the fine image portion of the input image is processed.

FIG. 12 shows a second embodiment of the image processing apparatus according to the present invention. In FIG. 12, the parts of the image processing apparatus which are essentially the same as the corresponding parts of the apparatus shown in FIG. 3 are designated by the same reference numerals, a description thereof being omitted.

In the image processing apparatus shown in FIG. 12, the 4-bit digital image signal PD output by the A/D converter 2 is supplied to an MTF corrector 10 and an MTF mode discriminator 11. The MTF mode discriminator 11 detects whether the MTF mode-1 or the MTF mode-2 should be selected, based on the density level of the target pixel indicated by the input image signal PD. The MTF mode discriminator 11 outputs a mode select signal MD indicating the result of the detection to the MTF corrector 10.

The MTF corrector 10 performs the appropriate MTF correction process in accordance with the mode select signal MD received from the MTF mode discriminator 11. If the mode select signal MD indicates that the MTF mode-1 should be selected, the MTF corrector 10 performs the MTF correction process according to the formula (2). If the mode select signal MD indicates that the MTF mode-2 should be selected, the MTF corrector 10 performs the MTF correction process according to the formula (3). The MTF corrector 10 outputs a corrected image signal CD indicating the result of the MTF correction (or, the corrected density level of the target pixel) to the bi-level rendition part 5.

In accordance with the corrected image signal CD received from the MTF corrector 10, the bi-level rendition part 5 outputs a bi-level image signal BW to the output part 7 so that the bi-level image signal BW is output to an external unit (not shown) through the output part 7.

Figure 13:
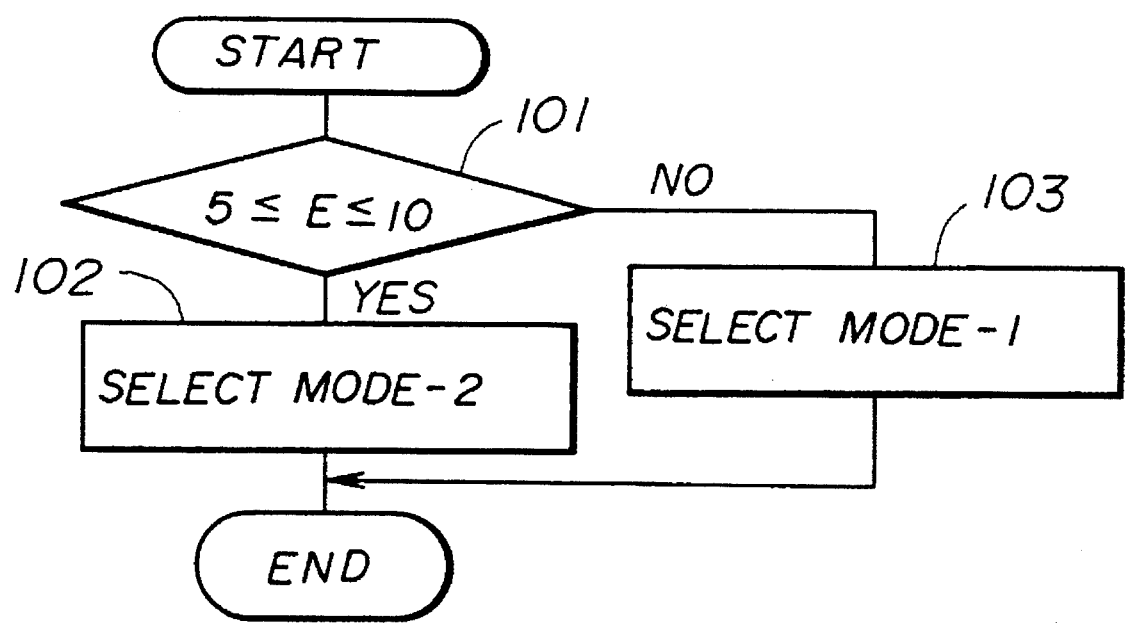
FIG. 13 is a flow chart for explaining an MTF mode detection process performed by an MTF mode discriminator of the image processing apparatus shown in FIG. 12.

FIG. 13 shows a mode detection process performed by the MTF mode discriminator 11 shown in FIG. 12. For the sake of convenience, a case in which the 4-bit digital image signal PD is processed will be described. In step 101, the MTF mode discriminator 11 detects whether or not the density value E of the target pixel indicated by the signal PD falls in a range between 5 and 10 in decimal. If it is detected in step 101 that the density level E falls in the range between 5 and 10 in decimal, the target pixel has an intermediate density and a fine image portion of the original image is being processed. Thus, step 102 selects the MTF mode-2 so that the MTF correction process with a sharp correction effect is performed by the MTF corrector 10 via the mode select signal MD.

If it is detected in step 101 that the density value E does not fall in the above mentioned range, the target pixel has a density value which is smaller than the lowest level "5" or greater than the highest level "10", and a background portion of the input image or the like is being processed. Thus, step 103 selects the MTF mode-1 so that the MTF correction process with a moderate correction effect is performed by the MTF corrector 10 via the mode select signal MD.

In the above described embodiment, the picture quality of the bi-level image indicated by the signal BW output by the bi-level rendition part 5 can be increased since the MTF correction process appropriate for the input image is selectively performed.

Figure 14:
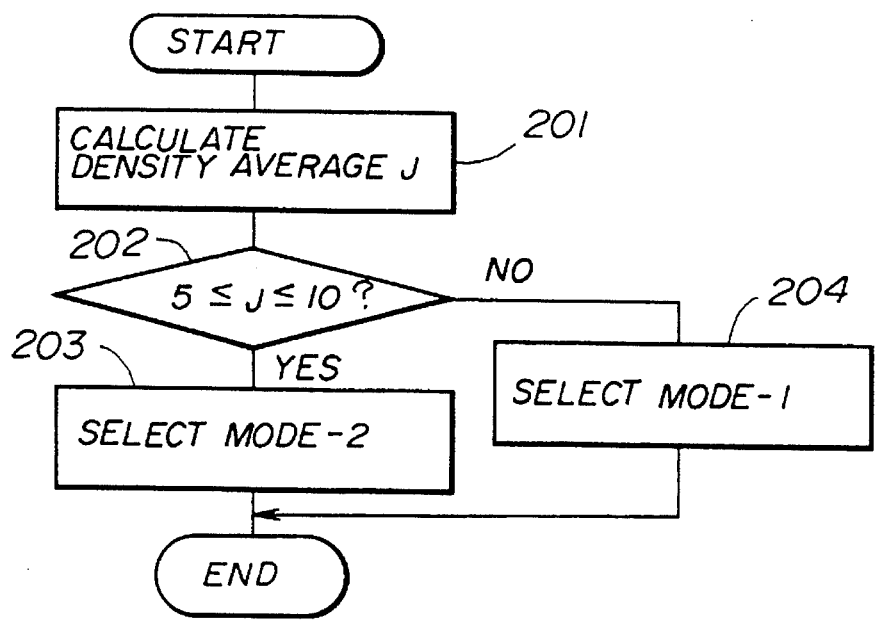
FIG. 14 is a flow chart for explaining another MTF mode detection process.

FIG. 14 shows another mode detection process performed by the MTF mode discriminator. In step 201, the MTF mode discriminator calculates the average J of the density values (A, B, C, D, E, F, G, H and I) of the target pixel and the eight neighborhood pixels. Step 202 detects whether or not the calculated average J in step 201 falls in the range between 5 and 10 in decimal. If it is detected in step 202 that the average J falls in the range between 5 and 10 in decimal, the target pixel has an intermediate density and a fine image portion of the original image is being processed. Thus, step 203 selects the MTF mode-2 so that the MTF correction process with a sharp correction effect is performed by the MTF corrector 10 via the mode select signal MD.

If it is detected in step 202 that the average J does not fall in the above mentioned range, the target pixel has a density value which is smaller than the lowest level "5" or greater than the highest level "10" and a background portion of the input image or the like is being processed. Thus, step 204 selects the MTF mode-1 so that the MTF correction process with a moderate correction effect is performed by the MTF corrector 10 via the mode select signal MD.

Figure 15:
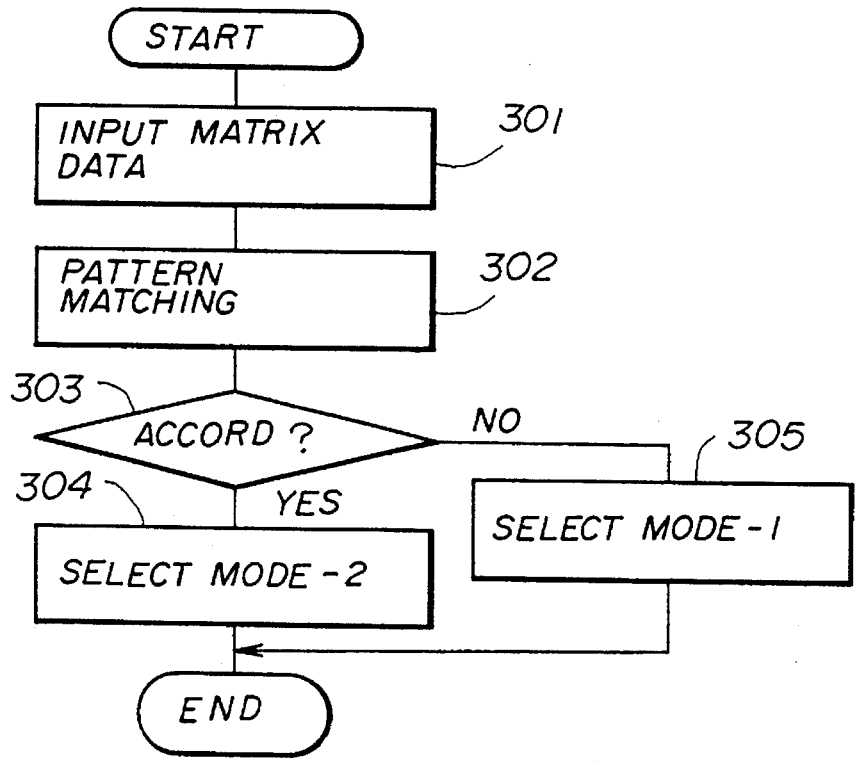
FIG. 15 is a flow chart for explaining still another MTF mode detection process.

FIG. 15 shows still another mode detection process performed by the MTF mode discriminator. In this mode detection process, the MTF mode discriminator detects whether or not there is a dot pattern inherent to a fine image portion of the input image. When such a pattern is detected, it is determined that the fine image portion of the input image is being processed. In step 301, a matrix data of the density values of the target pixel and the neighborhood pixels is input. In step 302, the MTF mode discriminator performs a pattern matching with respect to the input matrix data. Step 303 detects whether or not the matrix data accords with a prescribed pattern inherent to the fine image portion of the input image as the result of the pattern matching process. If it is detected in step 303 that the matrix data accords with the prescribed pattern, the target pixel has an intermediate density and the fine image portion of the input image is being processed. Thus, step 304 selects the MTF mode-2 so that the MTF correction process with a sharp correction effect is performed by the MTF corrector 10 via the mode select signal MD.

If it is detected in step 303 that the matrix data does not accord, the background portion of the input image or the like is being processed. Thus, step 305 selects the MTF mode-1 so that the MTF correction process with a moderate correction effect is performed by the MTF corrector 10 via the mode select signal MD.

Next, a description will be given of a third embodiment of the image processing apparatus, by referring to FIGS. 16 and 17. When a composite image in which a halftone image such as a photograph and a non-halftone image (or a bi-level image) such as a character coexist is subjected to the MTF correction process, the picture quality of the halftone portion in the output image may become degraded. Also, when the composite image is subjected to the pseudo halftone rendition process to which the error diffusion method is applied, the picture quality of the non-halftone portion in the output image may become degraded. The third embodiment of the present invention is intended to eliminate such problems.

Figure 16:
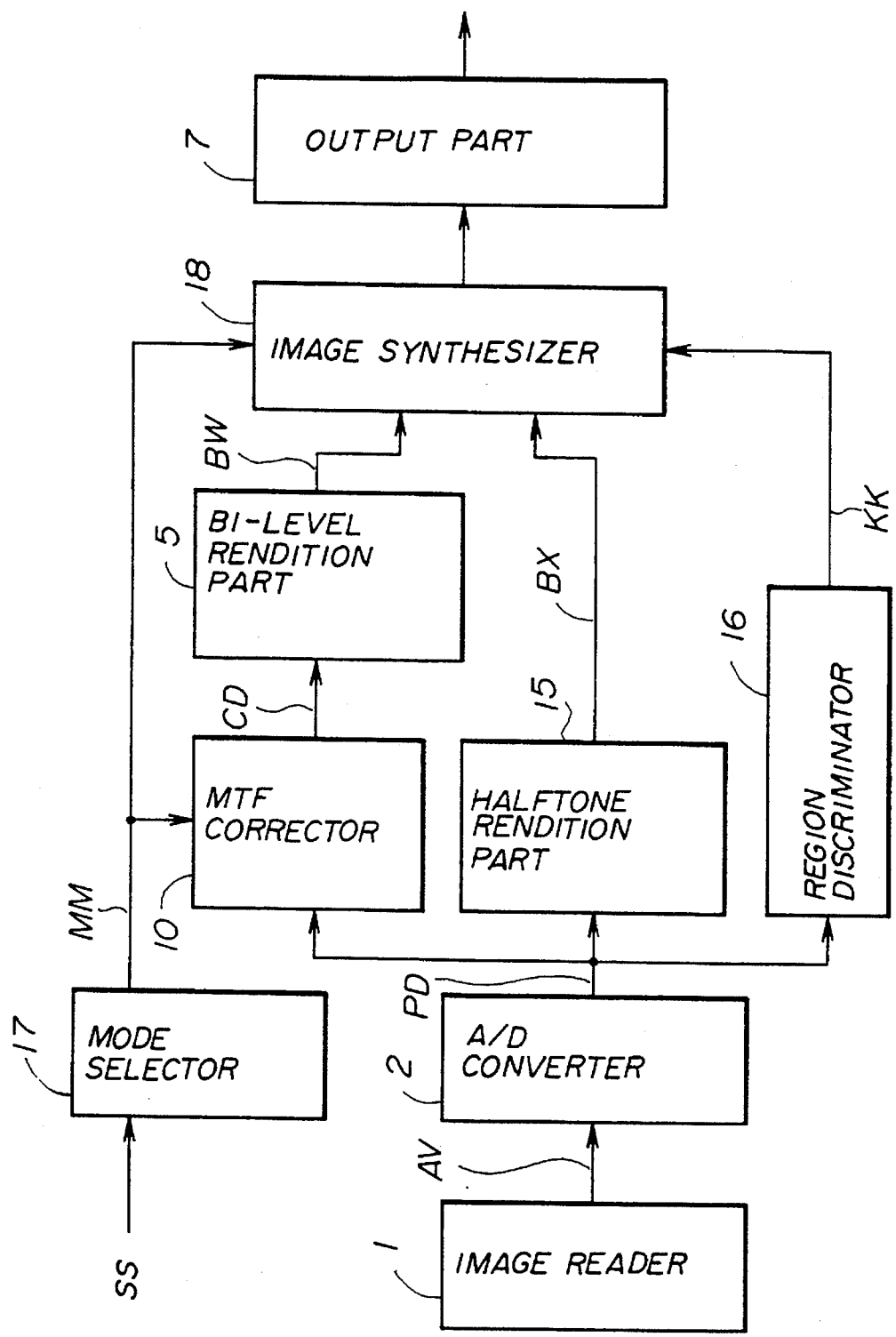
FIG. 16 is a block diagram showing a third embodiment of the image processing apparatus according to the present invention.

FIG. 16 shows the third embodiment of the image processing apparatus according to the present invention. In FIG. 16, the parts of the image processing apparatus which are essentially the same as the corresponding parts of the apparatus shown in FIG. 12 are designated by the same reference numerals, a description thereof being omitted. This image processing apparatus further includes a halftone rendition part 15, a region discriminator 16, a mode selector 17, and an image synthesizer 18.

In the image processing apparatus shown in FIG. 16, an external controller (not shown) supplies an image type signal SS to the mode selector 17. If the image type signal SS indicates that the input image supplied by the image reader 1 is a composite image, the mode selector 17 outputs a mode select signal MM indicating an instruction to select the MTF mode-2. If the image type signal SS indicates that the input image is a bi-level image such as a character, the mode selector 17 outputs a mode select signal MM indicating an instruction to select the MTF mode-1. The mode select signal MM is supplied by the mode selector 17 to the MTF corrector 10 and the image synthesizer 18.

The 4-bit digital image signal PD output by the A/D converter 2 is supplied to the MTF corrector 10, the halftone rendition part 15, and the region discriminator 16. The MTF corrector 10 performs the MTF correction process for the 4-bit digital image signal PD in accordance with the mode select signal MM received from the mode selector 17. If the mode select signal MM indicates that the MTF mode-1 should be selected, the MTF corrector 10 performs the MTF correction process according to the formula (2) so that the density value of the target pixel is corrected. If the mode select signal MM indicates that the MTF mode-2 should be selected, the MTF corrector 10 performs the MTF correction process according to the formula (3) so that the density value of the target pixel is corrected. The MTF corrector 10 outputs a corrected image signal CD indicating the result of the MTF correction to the bi-level rendition part 5.

In accordance with the corrected image signal CD received from the MTF corrector 10, the bi-level rendition part 5 produces a bi-level image signal BW by comparing the signal CD with a prescribed threshold value, and outputs the bi-level image signal BW indicating the result of the bi-level rendition to the image synthesizer 18.

The halftone rendition part 15 performs the above bi-level rendition process to which the error diffusion method is applied, with respect to the 4-bit digital image signal PD received from the A/D converter 2, and outputs a bi-level image signal BX indicating the result of the bi-level rendition process to the image synthesizer 18. A delay time needed for the halftone rendition part 15 to perform the bi-level rendition process is adjusted so as to accord with a delay time needed for the MTF corrector 10 and the bi-level rendition part 5 to perform the MTF correction process and the bi-level rendition process respectively.

The region discriminator 16 is a known region discriminating device, and it detects whether the target pixel indicated by the received image signal PD lies in a halftone region of the input image or in a non-halftone region thereof. The region discriminator 16 outputs a region detect signal KK indicating the result of the region detection to the image synthesizer 16. The region discriminator 16 in this example detects that the target pixel lies in the non-halftone region of the input image, only when the target pixel is located in the vicinity of a bi-level line region of the input image.

When the mode select signal MM indicates that the MTF mode-2 should be selected, the image synthesizer 18 selects an appropriate image signal in accordance with the region detect signal KK received from the region discriminator 16. If the region detect signal KK indicates that the target pixel lies in a halftone region of the input image, the image synthesizer 16 selects the bi-level image signal BX received from the halftone rendition part 15. If the region detect signal KK indicates that the target pixel lies in a non-halftone region of the input image, it selects the bi-level image signal BW received from the bi-level rendition part 5. The selected image signal BW or BX is output by the image synthesizer 18 to the output part 7. Conversely, when the mode select signal MM indicates that the MTF mode-1 should be selected, the image synthesizer 18 always selects the bi-level image signal BW received from the bi-level rendition part 5, and outputs the image signal BW to the output part 7.

Accordingly, in the third embodiment described above, when the type of the input image indicated by the image type signal SS is a composite image, the image processing apparatus subjects the halftone region of the composite image to the pseudo halftone bi-level rendition process with no MTF correction process being performed, and it subjects the non-halftone region of the composite image to the MTF correction process and the simple bi-level rendition process. Thus, it is possible to prevent the picture quality of the halftone region of the composite image from being degraded due to the performing of the MTF correction process.

Also, when the type of the input image indicated by the image type signal SS is a bi-level image, the image processing apparatus of this embodiment subjects the input image to the MTF correction process according to the MTF mode-1. Thus, it is possible to safely prevent the picture quality of the non-halftone image (or the bi-level image) from being degraded due to the performing of the pseudo halftone bi-level rendition process.

In the third embodiment described above, the MTF correction process according to the MTF mode-2 is performed when the bi-level region of the composite image is processed, so that a sharp edge portion of the bi-level image is produced without degrading the picture quality. The same functions of the image processing apparatus as described above can also be achieved by selecting a lower threshold value when the bi-level region of the composite image is processed by means of the bi-level rendition part 5. FIG. 17 shows a modification of the image processing apparatus shown in FIG. 16 which modification is intended for this purpose. In the following description of the modified image processing apparatus, a case in which a 4-bit digital image signal PD is output by the A/D converter 2 is considered for the sake of convenience.

Figure 17:
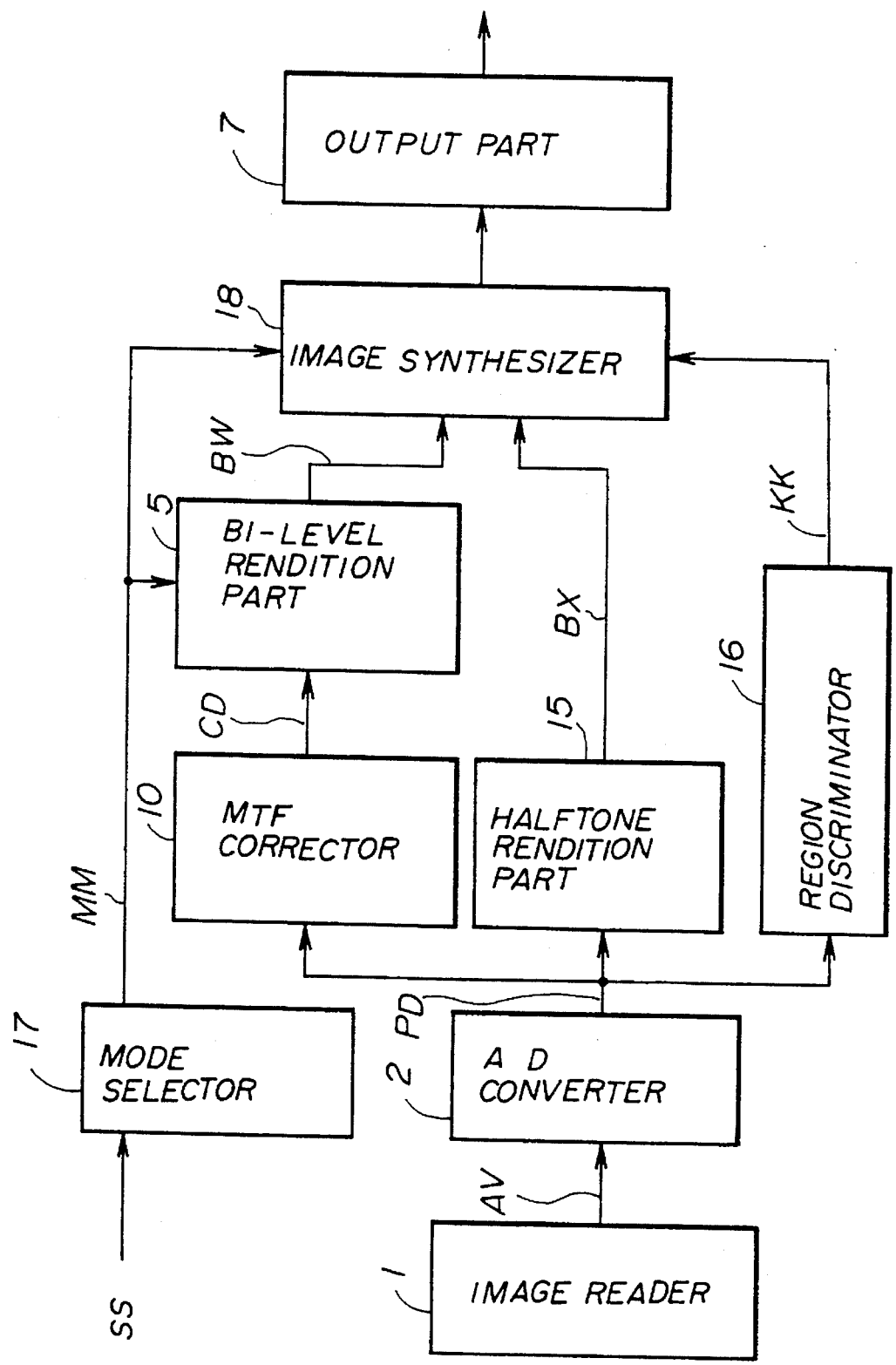
FIG. 17 is a block diagram showing a modification of the image processing apparatus shown in FIG. 16.

In the image processing apparatus shown in FIG. 17, the MTF corrector 10 invariably performs the above described MTF correction process according to the MTF mode-1, regardless of whether the MTF mode-1 or the MTF mode-2 is indicated by the mode select signal MM. The MTF corrector 10 then outputs a corrected image signal CD to the bi-level rendition part 5.

When the MTF mode-1 is indicated by the mode select signal MM, the bi-level rendition part 5 produces a bi-level image signal BW by comparing the corrected image signal CD with a standard threshold value (which is equal to, for example, "8" in decimal), and it outputs a bi-level image signal BW indicating the result of the bi-level rendition to the image synthesizer 18. When the MTF mode-2 is indicated by the mode select signal MM, the bi-level rendition part 5 produces a bi-level image signal BW by comparing the corrected image signal CD with a threshold value (which is equal to, for example, "6" in decimal) that is lower than the standard threshold value, and it outputs the bi-level image signal BW to the image synthesizer 18.

Accordingly, in the image processing apparatus shown in FIG. 17, when a bi-level line region of a composite image is being processed, the bi-level rendition part 5 performs the bi-level rendition process using the lower threshold level, so that an edge portion of the bi-level image becomes sharp and the picture quality is increased efficiently. When the remaining regions of the composite image different from the bi-level line region are being processed, the target pixel in those regions is detected as being in a halftone region of the input image and the image synthesizer 18 selects the bi-level image signal BX received from the halftone rendition part 15, thus preventing the picture quality of the background portion of the output image from being degraded.

Figure 18:
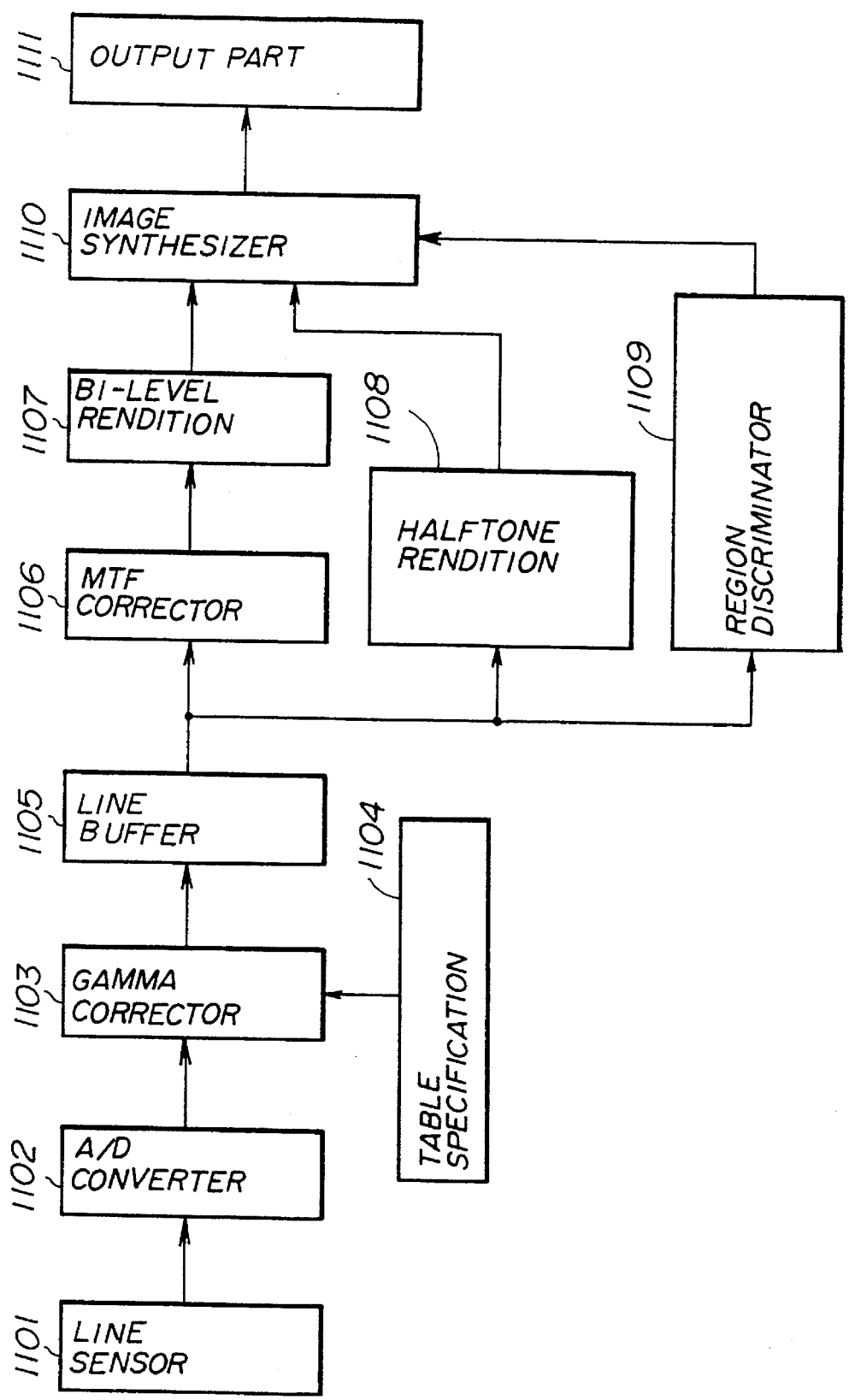
FIG. 18 is a block diagram showing a fourth embodiment of the image processing apparatus according to the present invention.

Next, a description will be given of a fourth embodiment of the image processing apparatus according to the present invention, by referring to FIGS. 18 through 23. In FIG. 18, a line sensor 1101 reads one scanning line of a multilevel image from an original document. This multilevel image is indicated by an analog image signal output by the line sensor 1101. This analog image signal is converted into a multilevel digital image signal by an A/D converter 1102. The multilevel digital image signal output by the A/D converter 1102 is supplied to a gamma corrector 1103. The gamma corrector 1103 performs a gamma correction process with respect to the multilevel digital image signal received from the A/D converter 1102. A memory part 1104 for storing a gamma table specification defining the input-output characteristics of the gamma correction is coupled to the gamma corrector 1103, and the gamma table specification stored in the memory part 1104 is used when the gamma correction process is performed. A line buffer 1105 temporarily stores the multilevel image data corresponding to a number of scanning lines, the multilevel image data being output by the gamma corrector 1103.

In the image processing apparatus shown in FIG. 18, a bi-level rendition part 1107, a pseudo halftone rendition part 1108, a region discriminator 1109, an image synthesizer 1110 and an output part 1111 are essentially the same as those corresponding parts of the apparatus shown in FIG. 16, and a description thereof will be omitted.

Figure 19:
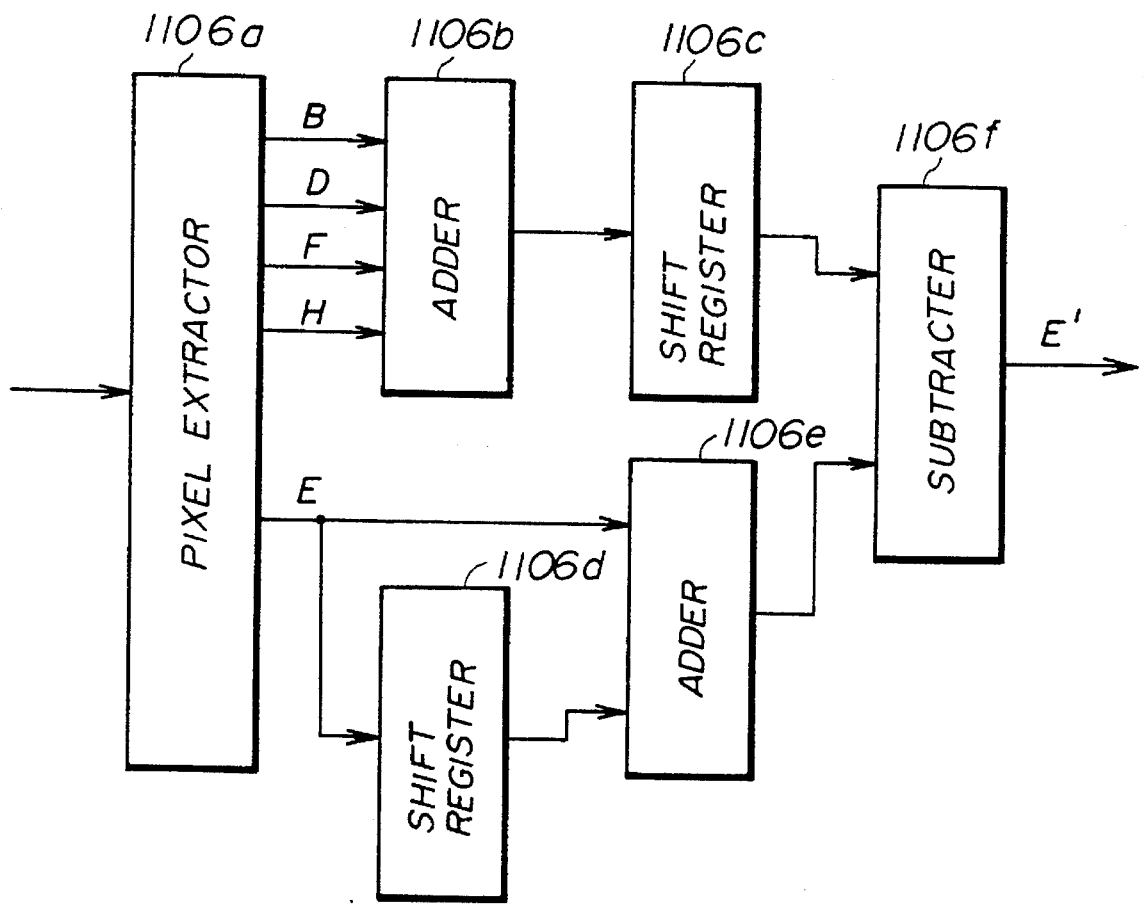
FIG. 19 is a block diagram showing an MTF corrector of the image processing apparatus shown in FIG. 18.

FIG. 19 shows an MTF corrector 1106 in the image processing apparatus shown in FIG. 18. This MTF corrector 1106 performs the MTF correction process with respect to the multilevel digital image signal received from the gamma corrector 1103 via the line buffer 1105.

In the MTF corrector 1106 shown in FIG. 19, a pixel extractor 1106a outputs a set of density values (E, B, D, F, H) of a target pixel and four neighborhood pixels thereof from the multilevel digital image data corresponding to a number of scanning lines stored in the line buffer 1105. In this respect, the target pixel and the neighborhood pixels thereof are taken out from a group of pixels arranged in 3×3 formation in the input image as shown in FIG. 11, and the set of the density values are selected from the multilevel digital image data corresponding to three scanning lines stored in the line buffer 1105. An adder 1106b outputs a sum of the density values (B, D, F, H) of the four neighborhood pixels in binary in accordance with the data received from the pixel extractor 1106a.

After a value of the sum of the density values is received from the adder 1106b, a shift register 1106c outputs a value of ½ of the sum of the density values (B, D, F, H) by shifting the received binary data to the right (to one lower-order bit). After a value of the density value E of the target pixel is received from the pixel extractor 1106a, a shift register 1106d outputs a value of twice of the density value E by shifting the received binary data to the left (to one higher-order bit).

Receiving the value of the density value E of the target pixel from the pixel extractor 1106a and the value of twice of the density value E thereof from the shift register 1106d respectively, an adder 1106e outputs a value of three times the density value E of the target pixel to a subtracter 1106f. Also, the shift register 1106c outputs the value of ½ of the sum of the density values (B, D, F, H) of the four neighborhood pixels to the subtracter 1106f. The subtracter 1106f outputs a value E' of a corrected density of the target pixel to the bi-level rendition part 1107 by subtracting the former value (B+D+F+H) from the latter value 3E. This output density value E' calculated as the result of the MTF correction process performed by the MTF corrector 1106 is represented by the formula (2) described above. As described above, when a sharp MTF correction effect is desired, it is necessary to apply the above formula (3) to the MTF corrector 1106.

In accordance with the input-output characteristics of the gamma table specification stored in the memory part 1104, the gamma corrector 1103 converts an input multilevel digital signal (received from the A/D converter 1102) into an output multilevel digital signal, and this output multilevel digital signal is supplied to the MTF corrector 1106, the pseudo halftone rendition part 1108, and the region discriminator 1109. For the sake of convenience, a case in which the density indicated by the input multilevel digital signal received from the A/D converter 1102 ranges from the value "0" (the white density level) to the value "255" (the black density level) and in which the corrected density indicated by the output multilevel digital signal output by the gamma corrector 1103 ranges from the value "0" (the white density level) to the value "63" (the black density level) is considered.

Figure 20:
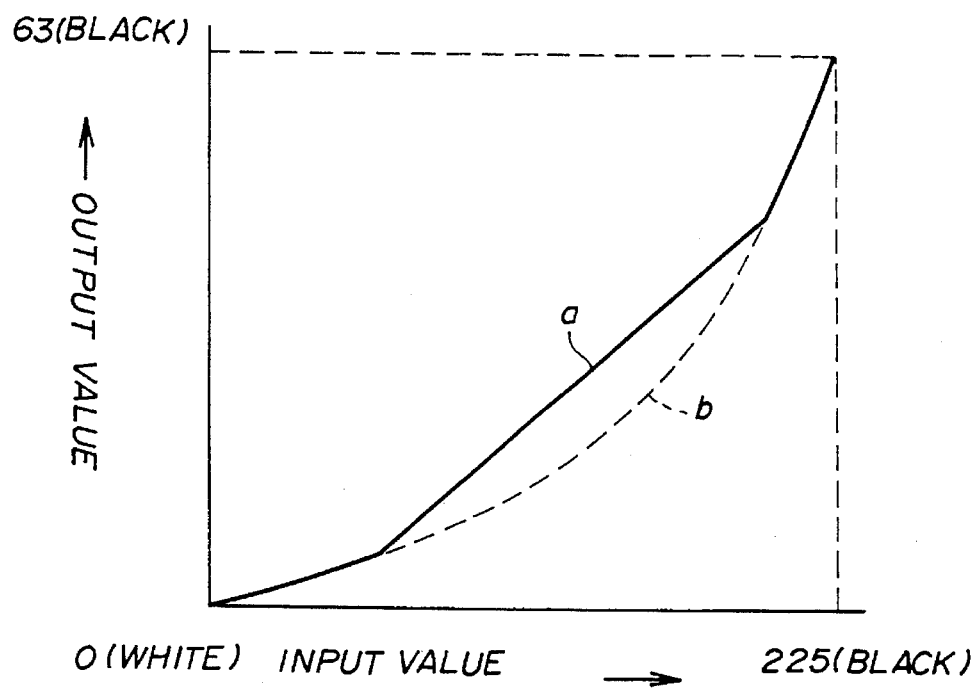
FIG. 20 is a chart for explaining the input-output characteristics of a gamma correction process performed by a gamma corrector of the image processing apparatus shown in FIG. 18.

FIG. 20 shows a characteristic curve which is used as the input-output characteristics of the gamma table specification according to the present invention. This characteristic curve includes a linear curve portion "a" corresponding to intermediate density values of the input multilevel digital signal, and non-linear curve portions "b" corresponding to lower density values of the input multilevel digital signal (near the white density level "0") and corresponding to higher density values thereof (near the black density level "255"), as shown in FIG. 20. According to the present invention, when the input multilevel digital signal indicates an intermediate density value, the gamma corrector 1103 outputs a multilevel digital image signal whose density is converted in accordance with the linear curve portion "a" shown in FIG. 20. When the input multilevel digital signal indicates a lower density value or a higher density value, the gamma corrector 1103 outputs a multilevel digital image signal whose density is converted in accordance with the non-linear curve portions "b" shown in FIG. 20.

In the fourth embodiment described above, the multilevel digital image data is subjected to the gamma correction process, and the result of the gamma correction process is temporarily stored in the line buffer. In the gamma correction process, the input multilevel digital image data is corrected in accordance with the non-linear input-output characteristics when the target pixel has a lower density value or a higher density value, and it is corrected in accordance with the linear input-output characteristics when the target pixel has an intermediate density value.

The bi-level region of the multilevel digital image supplied from the line buffer 1105 is subjected to the MTF correction process and the bi-level rendition process. Thus, the MTF correction is effective in the bi-level region of the output image and the picture quality is reliably increased. The halftone region of the multilevel digital image after the above described gamma correction process is performed is subjected to the pseudo halftone rendition process. Thus, the pseudo halftone rendition process is effective in the halftone region of the output image without degrading the picture quality due to the performing of the MTF correction process. Also, the image processing apparatus of this embodiment requires only one buffer memory (the line buffer 1105), and the manufacturing cost can be reduced.

Figure 21:
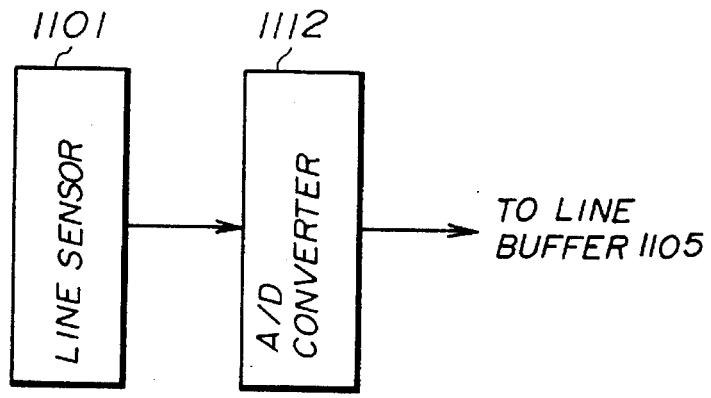
FIG. 21 is a block diagram showing a modification of the image processing apparatus shown in FIG. 18.

FIG. 21 shows a modification of the image processing apparatus shown in FIG. 18. In this embodiment, the line sensor 1101 which is the same as shown in FIG. 18 is coupled to a modified A/D converter 1112, and this A/D converter 1112 is coupled directly to the line buffer 1105 which is the same as shown in FIG. 18. Thus, the gamma corrector 1103 and the memory part 1104 shown in FIG. 18 are omitted in this embodiment.

Figure 22:
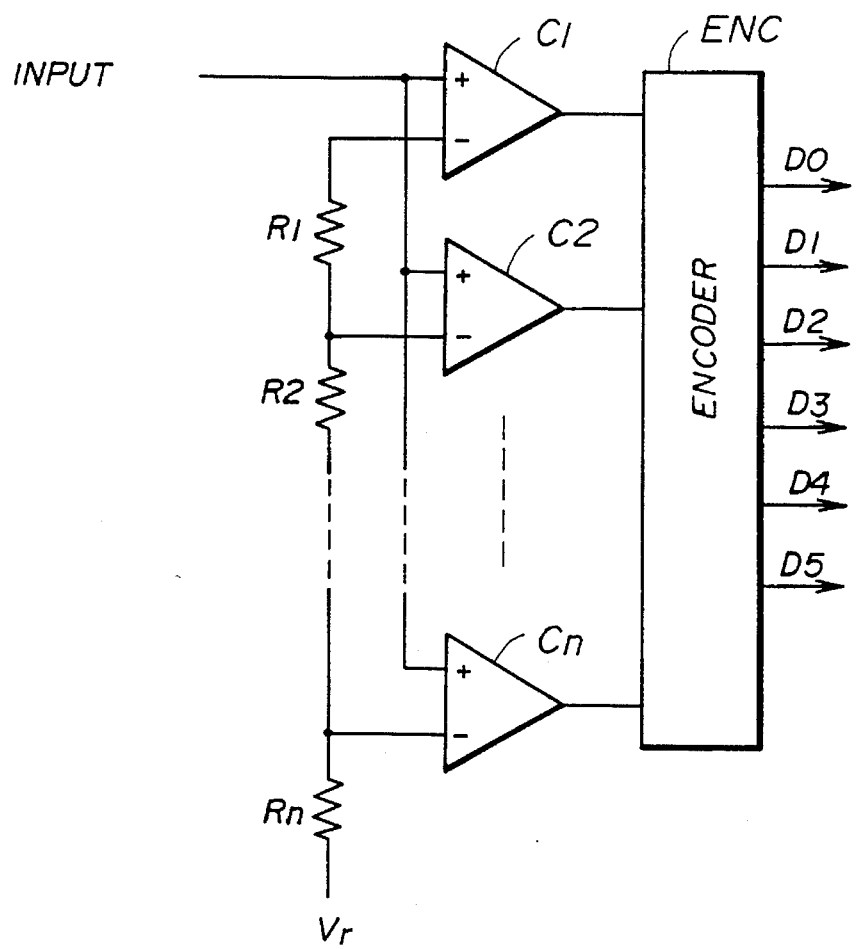
FIG. 22 is a diagram showing an A/D converter of the image processing apparatus shown in FIG. 18.

FIG. 22 shows the construction of the A/D converter 1112 shown in FIG. 21. In the A/D converter 1112 of FIG. 22, a plurality of comparators C1 through Cn and an encoder ENC coupled to the comparators C1 through Cn are provided. The number of the comparators is determined depending on the number of gradation levels of the input analog image signal. The analog image signal supplied by the line sensor 1101 is input to each of the positive input terminals of the comparators C1 through Cn in the A/D converter 1112. A plurality of resistors R1 through Rn in series are connected to the negative input terminals of the comparators C1 through Cn, and each resistor is connected at both end portions thereof to the negative input terminals of two adjacent comparators. A prescribed reference voltage Vr is applied to one end portion of the resistor Rn, and a divided reference voltage which is preset in accordance with the resistance of each resistor is applied to the negative input terminal of each of the comparators C1 through Cn. When a voltage applied to the positive input terminal of each comparator is higher than or equal to a divided reference voltage applied to the negative input terminal thereof, the comparator is switched ON. Conversely, the comparator is switched OFF when the applied voltage is lower than the divided reference voltage.

The respective output signals of the comparators C1 through Cn are supplied to the encoder ENC, and the encoder ENC outputs the 6-bit multilevel digital image signal including a set of binary data D0 through D5 to the line buffer 1105. When the input analog image signal is input to the A/D converter 1112, a set of the comparators C1 through Ci (Ci: an intermediate comparator) from among the plurality of comparators are switched ON and the other comparators Ci+1 through Cn are switched OFF in accordance with the voltage level of the input analog image signal (which is received from the line sensor 1101). The encoder ENC outputs the 6-bit multilevel digital image signal to the line buffer 1105, the density value of the output image signal is determined in accordance with the number "i" of the comparators C1 through Ci which have been switched ON.

Figure 23:
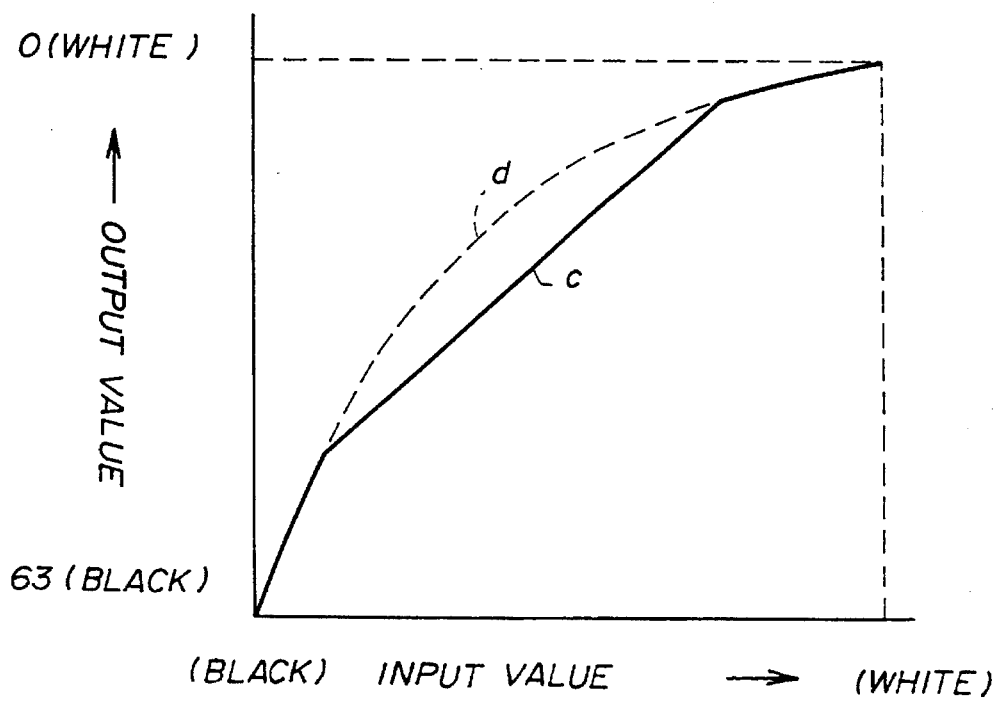
FIG. 23 is a chart for explaining the input-output characteristics used by the A/D converter shown in FIG. 22.

FIG. 23 shows a characteristic curve used by the A/D converter 1112 of FIG. 22 as the input-output characteristics of the analog-to-digital conversion, which correspond with the input-output characteristics of the gamma correction process described above. Similar to the characteristic curve shown in FIG. 20, this characteristic curve includes a linear curve portion "c" corresponding to a case in which an intermediate density value (which falls within a prescribed range of the input image signal) is indicated by the input image signal, and non-linear curve portions "d" corresponding to a lower density value (which is lower than the lower limit of the range and lies near the black density level as the minimum level) indicated by the input image signal and corresponding to an upper density value (which is higher than the upper limit of the range and lies near the white density level as the maximum level) indicated by the input image signal, as shown in FIG. 23.

In the above described embodiment, when the input analog image signal indicates an intermediate density value, the A/D converter 1112 outputs a multilevel digital image signal whose density is converted in accordance with the linear curve portion "c" shown in FIG. 23. When the input analog image signal indicates a lower density value or a higher density value, the A/D converter 1112 outputs a multilevel digital image signal whose density is converted in accordance with the non-linear curve portions "d" shown in FIG. 23. The above mentioned functions of the A/D converter 1112 can be achieved by suitably predetermining the respective resistances of the resistors R1 through Rn.

The characteristic curve shown in FIG. 23 is plotted in a direction in which the input signal value starts from the black density level and ends at the white density level, which direction is converse to that of the characteristic curve shown in FIG. 20. This is because the input image signal supplied by the line sensor 1101 has the maximum voltage when the white density level is indicated, and it has the minimum voltage when the black density level is indicated.

Further, the present invention is not limited to the above described embodiments, and variations and modifications may be made without departing from the scope of the present invention.

What is claimed is:

1. An image processing apparatus for generating an output bi-level image signal from a scanned input multilevel image signal through an error diffusion process, comprising:

bit conversion means for converting said scanned input multilevel image signal having an input image density value into an output multilevel image signal having an output image density value, said input image density value being represented as a first number of bits and said output image density value being represented as a second number of bits, said second number of bits including said first number of bits plus a third number of bits for converting said input image density value;

correction means for generating a corrected multilevel image signal having a corrected image density value based on said output multilevel image signal; and bi-level rendition means for generating an output bi-level image signal having an output bi-level image density value based on said corrected multilevel image signal, and for outputting the output bi-level image signal, said output bi-level image signal being a bi-level rendition of said corrected multilevel image signal, wherein said correction means includes means for performing error diffusion based on a difference between said corrected image density value and said bi-level image density, value for converting said output multilevel image signal into said corrected multilevel image signal.

2. An image processing apparatus according to claim 1, wherein said bit conversion means comprises a random number generator for generating a random number, and said bit conversion means assigns a density value of said random number to said remaining bits of the input image density value relating to the input multilevel image signal.

3. An image processing apparatus according to claim 1, wherein said bit conversion means comprises a logic circuit for generating a conjunction number based on a conjunction of density values relating to the input multilevel image signal, and said bit conversion means assigns a density value of said conjunction number to said remaining bits of the input image density value relating to the input multilevel image signal.

4. An image processing apparatus according to claim 1, further comprising error generating means, coupled to said correction means and said bi-level rendition means, for providing a difference between said corrected image density value and said bi-level image density value, to said error diffusion means of said correction means so that said error diffusion is performed based on said difference.

5. An image processing apparatus according to claim 1, wherein each said third number of bits, included in said output image density value of said output multilevel image signal from said bit conversion means, represents a predetermined value.

6. An image processing apparatus according to claim 3, wherein said conjunction number generated by said logic circuit is used as said third number of bits which are included in said output image density value of said output multilevel image signal.

7. An image processing apparatus according to claim 1, wherein at least one bit of said first number of bits is used as said third number of bits which are included in said output image density value of said output multilevel image signal.

8. An image processing apparatus according to claim 1, wherein said error diffusion means of said correction means performs arithmetic integer operations.

* * * * *